United States Patent
Weinberg et al.

(10) Patent No.: US 7,086,270 B2
(45) Date of Patent: Aug. 8, 2006

(54) METHOD FOR CONTINUOUS SENSOR SELF-TEST

(75) Inventors: Harvey Weinberg, Sharon, MA (US); John A. Geen, Tewksbury, MA (US)

(73) Assignee: Analog Devices, Inc., Norwood, MA (US)

(*) Notice: Subject to any disclaimer, the term of this patent is extended or adjusted under 35 U.S.C. 154(b) by 130 days.

(21) Appl. No.: 10/785,828

(22) Filed: Feb. 24, 2004

(65) Prior Publication Data
US 2005/0183489 A1 Aug. 25, 2005

(51) Int. Cl.
*G01P 9/04* (2006.01)

(52) U.S. Cl. ...................................................... 73/1.38
(58) Field of Classification Search ................. 73/1.01, 73/1.38
See application file for complete search history.

(56) References Cited

U.S. PATENT DOCUMENTS

| 5,753,793 | A  | * | 5/1998  | Lindahl et al. ............... 73/1.15 |
| 5,900,529 | A  | * | 5/1999  | Hanisko et al. .............. 73/1.38 |
| 6,298,709 | B1 | * | 10/2001 | Artzner et al. ............... 73/1.38 |
| 6,564,637 | B1 | * | 5/2003  | Schalk et al. ............. 73/504.12 |
| 6,629,448 | B1 | * | 10/2003 | Cvancara ..................... 73/1.38 |
| 6,668,614 | B1 | * | 12/2003 | Itakura ........................ 73/1.38 |
| 6,698,269 | B1 | * | 3/2004  | Baber et al. ................. 73/1.08 |

* cited by examiner

*Primary Examiner*—Robert Raevis
(74) *Attorney, Agent, or Firm*—Bromberg & Sunstein LLP

(57) ABSTRACT

A method and device for self-test of a sensor. The method includes stimulating the sensor with signals that generate sensor outputs at a frequency that differs from the frequency of expected sensed parameter signals. The sensor output is filtered to remove the effects of the stimulation inputs, generating a sensed parameter signal. The unfiltered sensor output is compared to the expected output of the sensor with the stimulus input. A malfunctioning sensor may be detected by the comparison and appropriate action may then be taken.

13 Claims, 3 Drawing Sheets

METHOD FOR CONTINUOUS SENSOR SELF-TEST

TECHNICAL FIELD

The present invention relates to methods of self-test for sensors and, particularly, for micromachined capacitive sensors.

BACKGROUND

Micromachined accelerometers can be used to sense acceleration for a variety of applications, including sensing the acceleration that occurs as a result of an automobile accident in order to trigger an air bag, or sensing the acceleration resulting from an earthquake in order to automatically shut off a gas line to prevent fires.

In one type of micromachined device, a polysilicon mass is suspended over a substrate by supporting tethers. The mass, which is essentially parallel to the substrate, has a beam elongated along an axis, and a number of fingers that extend away from the beam in a direction perpendicular to the axis of the beam. The beam and fingers are movable laterally relative to the substrate along the axis. Each of these movable fingers is positioned between two polysilicon fingers that are in the plane of the mass and are fixed relative to the substrate. Each movable finger and the fixed fingers on either side of the movable finger form a differential capacitor cell. The cells additively form a differential capacitor. A structure of this type is shown, for example, in U.S. Pat. No. 5,345,824.

Different approaches can be used to sense acceleration with such a differential capacitor. One approach is to use force feedback, as described in U.S. Pat. No. 5,345,824. The movable fingers (i.e., movable with the mass) are each centered between two fixed fingers. All the fixed fingers on one side of the movable fingers are electrically coupled together, and all the fixed fingers on the other side of the movable fingers are also electrically coupled together. The two sets of fixed fingers are at different DC potentials and are driven with AC carrier signals that are 180 degrees out of phase with respect to each response to an external force/acceleration along a sensitive axis, the mass with movable fingers moves toward one or the other set of fixed fingers. The signal on the beam is amplified, demodulated, and provided to an output terminal. A feedback network connects the output terminal and the beam. The feedback causes the movable fingers to be re-centered between the two sets of fixed fingers. The signal at the output terminal is a measure of the force required to re-center the beam, and is therefore proportional to acceleration.

Self-test by means of electro-static activation of a sensor's mechanical system has been used by many sensors, such as the accelerometer described above, but only at discrete periods of time when actual parameter measurement cannot take place. For example in an automotive safety system the inertial sensors may be tested at key-on when it is assumed that the vehicle is not moving. However, it may be desirable to test sensor integrity continuously, so that the safety system can be alerted to the malfunctioning of a sensor in real time and can take appropriate action.

SUMMARY OF THE INVENTION

In a first embodiment of the invention, a method and device are provided for determining a parameter value using a sensor while performing sensor self-test. The sensor is stimulated by self-test inputs at a stimulation frequency. The output of the sensor is then compared to the sensor response expected from the stimulation. If an unexpected response is detected from the sensor, a malfunction of the sensor may be identified. If the sensor output is as expected, the sensor output may be filtered to remove the effects of the stimulation and sensed parameter values may be determined based on the filtered signal.

In other embodiments of the invention, the stimulation of the sensor may be repeated over a range of duty cycles from a low duty cycle to a 100% duty cycle. In another embodiment of the invention, sensor self-test may be performed with minimal hardware support by using a system processor to control and monitor the sensor output. In a further embodiment of the invention, a system processor may cause self-test stimuli to be injected into the sensor at a low duty cycle and may determine sensed parameter values when the self-test stimuli are not injected.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In various embodiments of the present invention, a method of continuously testing sensors is provided. The method includes stimulating a sensor at high frequency and looking for appropriate sensor output response. A subsequent low pass filter can remove the response to the high-frequency self-test signal from the sensor output and allow a sensed parameter to be determined.

Figure 1A:
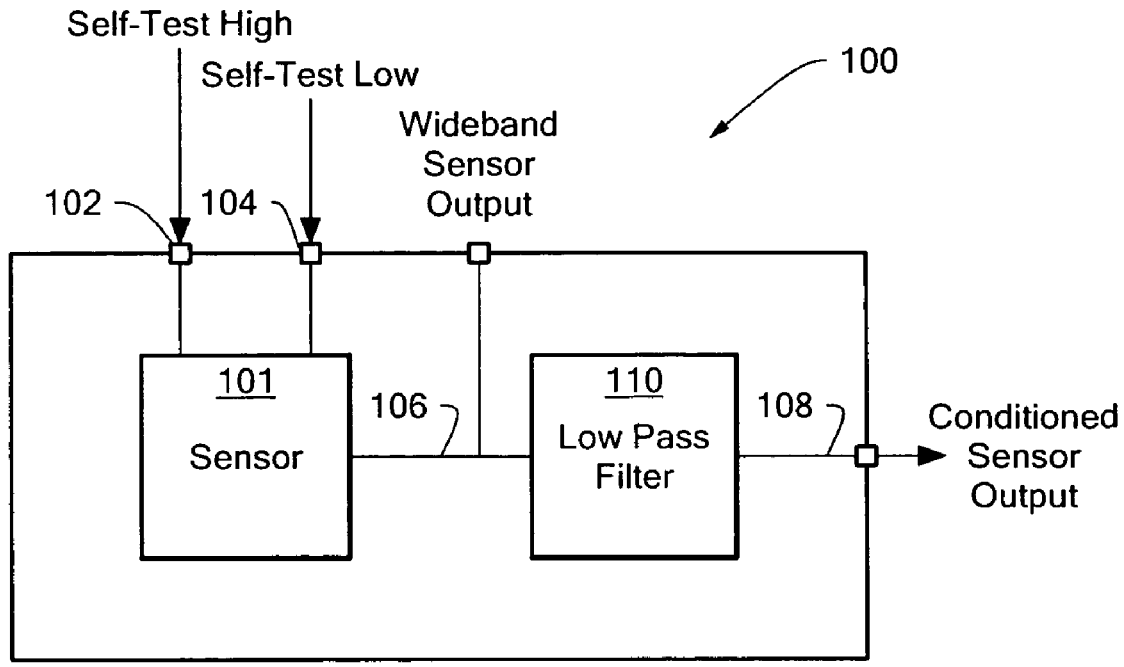
FIG. 1A is a block diagram for a self-testing sensor assembly according to an embodiment of the invention.
Figure 1B:
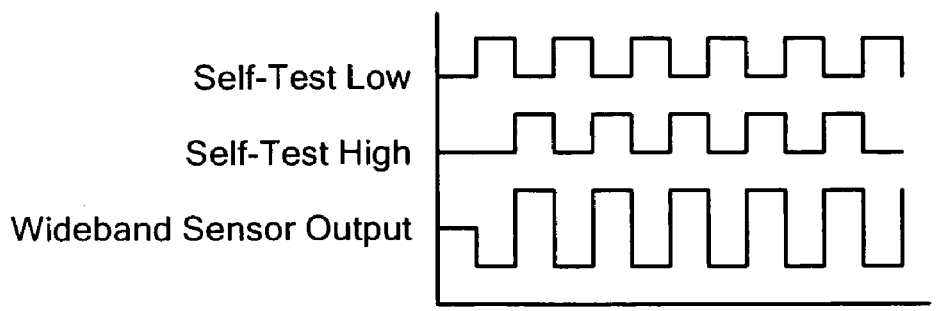
FIG. 1B shows exemplary waveforms for the embodiment of FIG. 1A.

FIG. 1A shows an exemplary sensor system 100 according to an embodiment of the invention. A sensor 101, for example, an accelerometer or a gyroscopic sensor, is provided that includes complementary self-test inputs. As used in this specification and in any appended claims, "complementary self-test inputs" will mean inputs where a self-test stimulus input 102 causes an increase in sensor output while another self-test stimulus 104 causes a decrease in output. These complementary self-test stimuli may be toggled at high speeds, using for example, square waves inputs to the sensor that are 180 degrees out of phase. A wide bandwidth output 106 of the sensor is monitored and the sensor output signal 106 is compared to the sensor output expected from the self-test stimulus inputs. FIG. 1B shows sample waveforms for the test stimulation inputs and the wideband sensor output. The comparison may be made by a variety of means as are known to those skilled in the art. A malfunctioning sensor should become apparent when the actual and expected wideband sensor outputs are compared. An error condition may be signaled or an alarm may be made or other action may be taken if the divergence between the actual and the expected wideband sensor output exceeds a threshold level. A subsequent low pass filter stage 110 may remove the sensor response due to high-frequency self-test signal, leaving only the sensed parameter signal 108.

Figure 2:
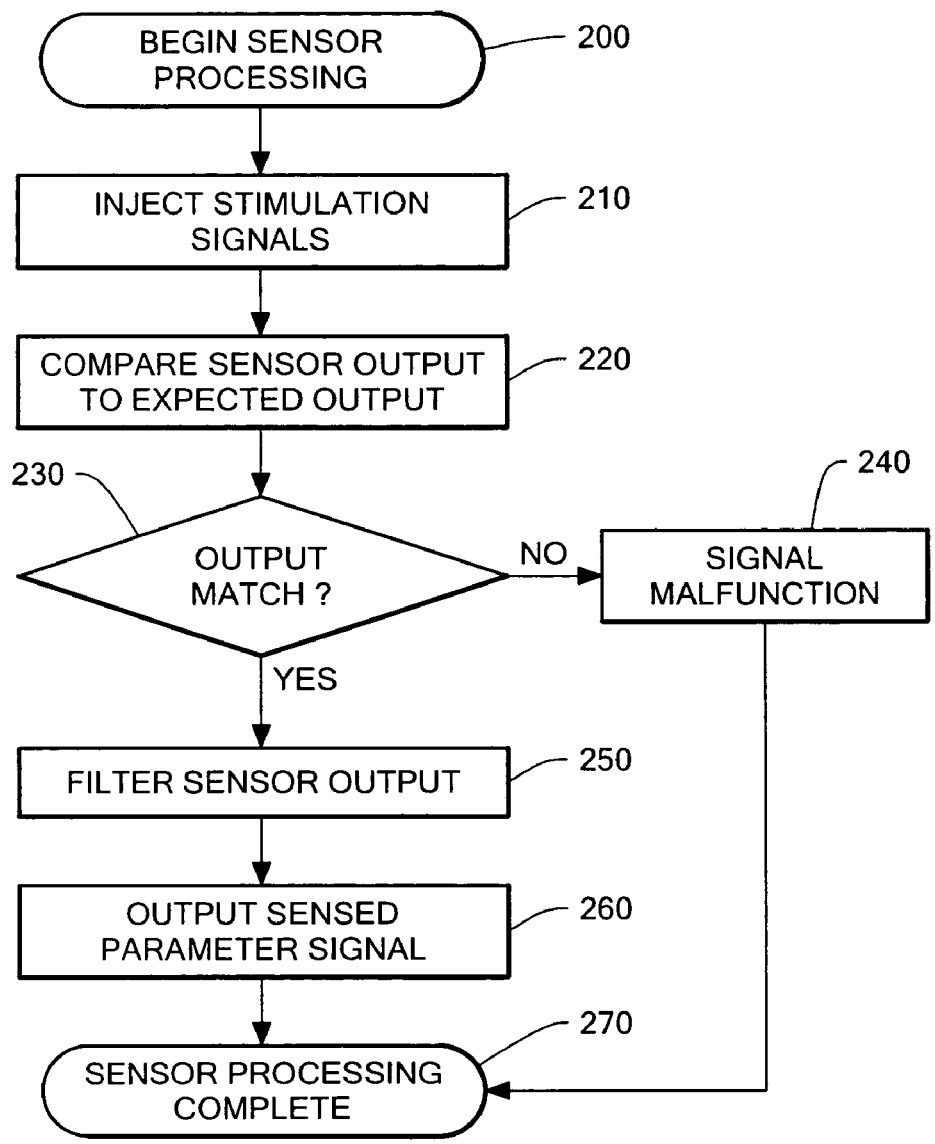
FIG. 2 is a flow diagram illustrating a method of sensor self-test according to an embodiment of the invention.

FIG. 2 is a flow diagram illustrating a method of performing sensor self-test using the sensor assembly 100 shown in FIG. 1. When the sensor becomes operational 200, stimulation signals are injected 210 at the self-test inputs 102, 104. If the sensor output differs sufficiently from the expected sensor output 220, 230 a sensor malfunction is declared 240 and sensor processing may be terminated 270. Otherwise, the output of the sensor is filtered 250 to remove the sensor response due to the self-test stimulation and a sensed parameter signal is generated 260. The process may be repeated and the duty cycle of the self-test stimulus signals may be varied from a low duty cycle up to a 100% duty cycle.

Figure 3:
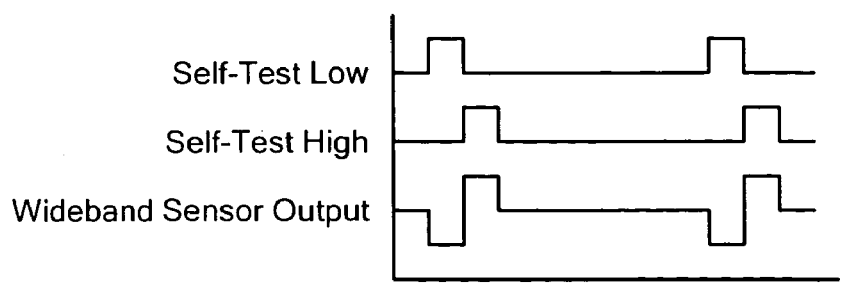
FIG. 3 shows alternative exemplary waveforms for the embodiment of FIG. 1.

In another embodiment of the invention, the sensor assembly of FIG. 1 is employed with a low duty cycle for the self-test stimuli. One advantage of such a system is that even if the responses to the complementary self-test inputs are not tightly matched, little apparent null shift in the sensor output will occur. FIG. 3 shows exemplary input and output waveforms for this embodiment of the invention.

Figure 4:
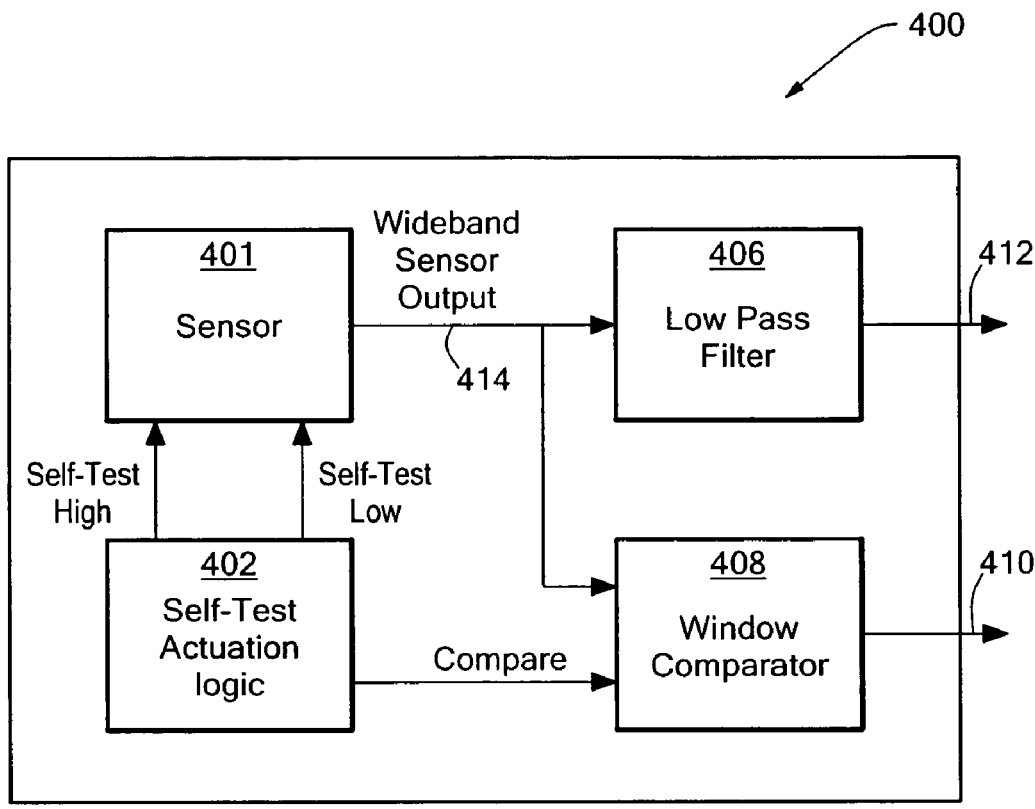
FIG. 4 illustrates a sensor assembly that provides self-test in a fashion that is transparent to a user.

Any of the above mentioned embodiments can be realized substantially in hardware and be transparent to the user as shown in the sensor assembly 400 in FIG. 4. In this embodiment, all of the above mentioned self-test functions are carried out by logic internal to the sensor assembly and a resultant self-test output 410 is available to the user. The sensor assembly 400 includes self-test logic 402 that generates complementary self-test signals that are input to the sensor 401. The sensor output is filtered by a low pass filter 406 to strip out the effects of the self-test stimuli on the sensor output and to generate a sensed parameter output 412. The unfiltered sensor output 414 is monitored by a comparator 408 to determine if the sensor response to the self-test stimuli matches the expected sensor response. A resultant self-test output 410 is generated whose value shows the result of the comparison. Thus, a user need only monitor output signal 410 to determine the self-test status of the sensor 401.

Figure 5:
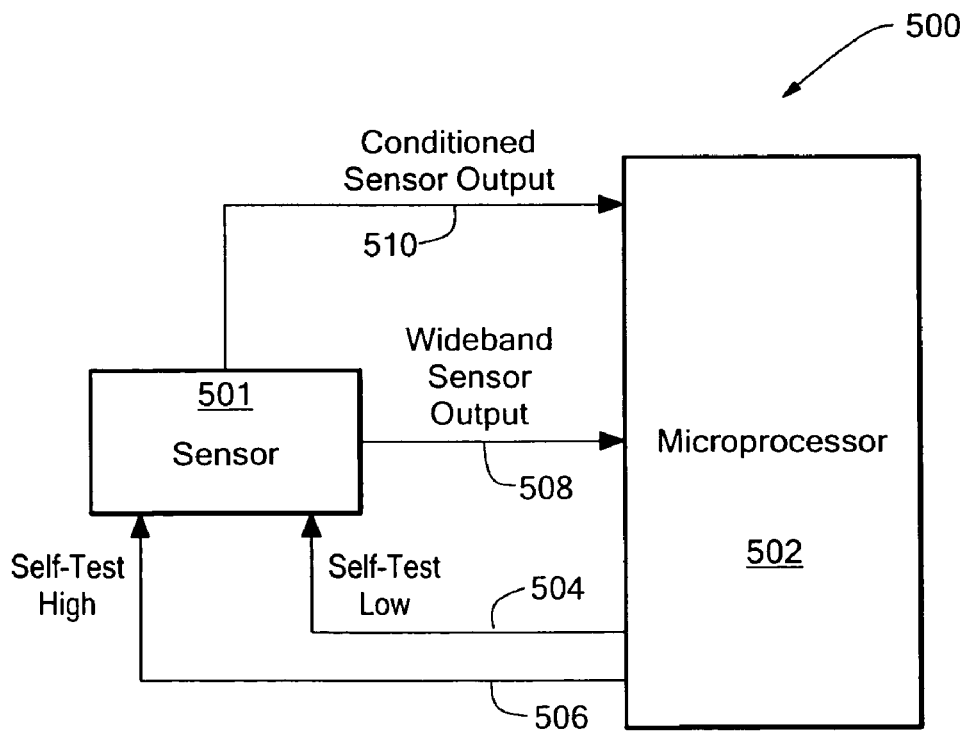
FIG. 5 illustrates a further sensor assembly that allows a user to generate a self-test capability using software and/or hardware that is external to the assembly.

In another embodiment of the invention, as illustrated in FIG. 5, a system 500 is provided that uses minimal hardware features to provide continuous self-test of a sensor 501. A system processor 502, such as, for example, a microprocessor, performs self-test control and monitoring of the sensor 501. The processor can generate output signals 504 and 506 that provide self-test stimuli for the sensor 501. The processor can filter the output 510 of the sensor to remove the effects of the self-test stimuli. The processor can then determine a sensed parameter value. Further, the processor can monitor the high frequency portion of the sensor output to determine if the actual sensor output matches the expected sensor output. If the sensor output differs from the expected output by a threshold amount, a sensor malfunction may be detected and the system processor may signal an alarm or take other action. In a further specific embodiment of the invention, a self-test stimulus can be provided to the sensor at a low duty cycle and the sensed parameter can be determined when the sensor response due to the self-test stimulus is substantially absent (the "stimulation off-period"). A sensor malfunction can be detected by comparing the sensor output to the expected sensor output when the sensor signal output from the self-test stimulus is expected (the "stimulation on-period").

In other specific embodiments of the preceding embodiment, sensor control and monitoring may be performed using a combination of software processing and additional support hardware. For example, a filter may be added to the output 510 of the sensor 501 to perform the filtering function and a wideband sensor output 508 may be monitored by the processor to determine if the sensor is malfunctioning.

It should be noted that a flow diagrams is used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer-executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk); or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Embodiments of the invention are not limited to any particular type of sensor such as the above described capacitive sensor. Further, the techniques described above may be applied to a wide range of sensor assemblies for sensing parameters beyond acceleration, rotation and the like. Other variations and modifications of the embodiments described above are intended to be within the scope of the present invention as defined in the appended claims.

What is claimed is:

1. A method for determining a sensed parameter using a sensor, the sensor generating a signal, the sensor including complementary self-test stimulation inputs, the method comprising:
    a. stimulating the sensor using the complementary self-test stimulation inputs;
    b. filtering the sensor signal;
    c. determining the sensed parameter based on the filtered sensor signal;
    d. comparing the sensor signal to an expected signal and generating a sensor self-test signal based at least in part on the comparison; and
    e. periodically repeating steps a through d.

2. A method according to claim 1, wherein the sensor stimulation is characterized by a stimulation frequency and the stimulation frequency and the signal frequency of the sensed parameter differ substantially.

3. A method according to claim 1 wherein the sensor stimulation is characterized by a stimulation on-period and a stimulation off-period and the sensed parameter value is determined substantially during the sensor stimulation off-period.

4. A method according to claim 3, further including comparing the sensor signal to an expected sensor signal during the sensor stimulation on-period and generating a sensor self-test signal based at least in part on the comparison.

5. A method according to claim 1 wherein the sensed parameter is at least one of an acceleration and a rotation.

6. A sensor assembly for determining a sensed parameter while testing a sensor, the sensor assembly comprising:
    a. the sensor, the sensor including an output for generating an output signal, the sensor including complementary self-test stimulation inputs;
    b. a stimulator connected to the sensor for injecting a stimulation signal;
    c. a filter connected to the sensor output, such that the filter substantially removes the portion of the output signal due to the stimulation signal; and
    d. a comparator connected to the sensor output, the comparator generating a sensor self-test signal.

7. A sensor assembly according to claim 6, wherein the stimulation signal is characterized by a stimulation frequency and the stimulation frequency and the signal frequency of the sensed parameter differ substantially.

8. A sensor assembly according to claim 6 wherein the sensed parameter is at least one of an acceleration and a rotation.

9. A sensor assembly according to claim 6 wherein the assembly includes a self-test output signal.

10. A computer program product for use on a computer system for determining a sensed parameter value while performing sensor self-test, the system including a sensor, the sensor including complementary self-test stimulation inputs, the computer program product comprising a computer usable medium having computer readable program code thereon, the computer readable program code including program code for:
    a. stimulating the sensor using the complementary self-test stimulation inputs;
    b. filtering a sensor output signal;
    c. determining the sensed parameter value based on the filtered sensor signal; and
    d. comparing the sensor signal to an expected signal and generating a sensor self-test signal based at least in part on the comparison.

11. A computer program product according to claim 10 further including program code for:
    e. periodically repeating steps a through d.

12. A computer program product according to claim 10 wherein the sensor includes complementary self-test inputs.

13. A computer program product according to claim 10 wherein the sensed parameter is at least one of an acceleration and a rotation.

* * * * *